(12) United States Patent
Banchs et al.

(10) Patent No.: US 11,448,502 B2
(45) Date of Patent: Sep. 20, 2022

(54) POSITIVE-LOCK CLAMP / ADAPTER

(71) Applicants: Emilio Banchs, Kalamazo, MI (US);
Oscar Ferreyra, Kalamazoo, MI (US);
Travis Gest, Portage, MI (US);
Donovan Mann, Mattawan, MI (US)

(72) Inventors: Emilio Banchs, Kalamazo, MI (US);
Oscar Ferreyra, Kalamazoo, MI (US);
Travis Gest, Portage, MI (US);
Donovan Mann, Mattawan, MI (US)

(*) Notice: Subject to any disclaimer, the term of this patent is extended or adjusted under 35 U.S.C. 154(b) by 962 days.

(21) Appl. No.: 16/207,165

(22) Filed: Dec. 2, 2018

(65) Prior Publication Data
US 2020/0173775 A1 Jun. 4, 2020

Related U.S. Application Data

(60) Provisional application No. 62/593,919, filed on Dec. 2, 2017.

(51) Int. Cl.
*G01B 5/255* (2006.01)
*G01B 21/26* (2006.01)
*F16B 1/00* (2006.01)
*F16B 2/02* (2006.01)

(52) U.S. Cl.
CPC ............... *G01B 21/26* (2013.01); *F16B 1/00* (2013.01); *F16B 2/02* (2013.01); *F16B 2001/0035* (2013.01)

(58) Field of Classification Search
CPC .......... G01B 5/245; G01B 5/25; G01B 5/252; G01B 5/0004; G01B 5/255; G01B 21/26; F16B 2/02; F16B 5/06; F16B 5/0628; F16B 5/0657
See application file for complete search history.

(56) References Cited

U.S. PATENT DOCUMENTS

| | | | | |
|---|---|---|---|---|
| 2,616,186 A | * | 11/1952 | Bender | G01B 5/255 33/203.17 |
| 2,795,859 A | * | 6/1957 | Buschbach | G01B 5/255 356/155 |
| 2,882,607 A | * | 4/1959 | Binder | G01B 5/255 33/203 |
| 3,314,727 A | * | 4/1967 | Murphy | B60B 11/06 301/12.1 |
| 3,330,044 A | * | 7/1967 | MacMillan | G01B 5/255 33/203.18 |
| 3,488,023 A | * | 1/1970 | Perell | B60B 29/00 33/203.18 |

(Continued)

*Primary Examiner* — Daniel J Wiley
(74) *Attorney, Agent, or Firm* — Clifford H. Kraft

(57) ABSTRACT

A wheel clamp attaches to a vehicle wheel for performing a wheel alignment on the vehicle. The wheel clamp has a mechanism to mount on the studs of the wheel and to securely mount on the flat surface of the rim. The wheel clamp may have a retractable mechanism that while mounted on the wheel's stud, can slide along the length of the stud without the need to turn it using the threads of the stud. Different methods may be used to attach to the stud, such as by means of treading a device, using a contraction mechanism or magnetic attraction. The wheel clamp has a crossbar and mechanism for supporting a measuring sensor, head or target and can be accommodated to different sizes, shapes and patterns of wheels and studs in the automotive industry.

5 Claims, 9 Drawing Sheets

(56) References Cited

U.S. PATENT DOCUMENTS

| | | | | |
|---|---|---|---|---|
| 3,576,372 | A * | 4/1971 | Baker | G01B 5/255 33/288 |
| 3,624,915 | A * | 12/1971 | Wilkerson | G01B 5/255 33/203.18 |
| 4,185,917 | A * | 1/1980 | Alsina | G01B 11/275 33/336 |
| 4,285,136 | A * | 8/1981 | Ragan | G01B 5/255 33/336 |
| 4,377,038 | A * | 3/1983 | Ragan | G01B 21/26 33/336 |
| 4,498,244 | A * | 2/1985 | Bendickson | G01B 11/275 33/203.15 |
| 4,508,612 | A * | 4/1985 | Blackwell | C23C 14/046 204/192.15 |
| 4,534,115 | A * | 8/1985 | Kashubara | G01B 11/275 33/193 |
| 4,569,140 | A * | 2/1986 | Hobson | G01B 5/255 33/203.18 |
| 4,574,489 | A * | 3/1986 | Grossart | G01B 5/255 33/203.18 |
| 4,580,612 | A * | 4/1986 | Smithkey | B60C 25/025 157/1.2 |
| 4,803,785 | A * | 2/1989 | Reilly | G01B 5/255 33/203.18 |
| 4,815,216 | A * | 3/1989 | Swayne | G01B 5/255 33/203.18 |
| 4,953,272 | A * | 9/1990 | Gevas | B60B 29/001 29/213.1 |
| 5,168,632 | A * | 12/1992 | Rimlinger, Jr. | G01B 5/255 33/203.18 |
| 5,222,785 | A * | 6/1993 | Green | B60B 7/068 301/37.35 |
| 5,339,508 | A * | 8/1994 | Ventress | B60S 5/00 72/704 |
| 5,446,967 | A * | 9/1995 | Gender | G01B 5/255 33/336 |
| 6,018,879 | A * | 2/2000 | Carder | G01B 5/255 33/203.18 |
| 6,131,293 | A * | 10/2000 | Maioli | G01B 5/255 33/203.18 |
| 6,282,799 | B1 * | 9/2001 | Warkotsch | G01B 5/255 33/203.18 |
| 6,507,988 | B1 * | 1/2003 | Riviere | G01B 5/255 33/203.18 |
| 6,622,389 | B1 * | 9/2003 | Pellegrino | G01B 5/255 33/562 |
| 7,117,603 | B1 * | 10/2006 | Pellegrino | G01B 5/255 33/203.18 |
| 7,478,482 | B1 * | 1/2009 | Pellegrino | G01B 5/255 33/562 |
| 8,443,865 | B2 * | 5/2013 | Story | G01M 1/045 157/18 |
| 9,581,524 | B2 * | 2/2017 | Liu | B25B 11/002 |
| 10,113,866 | B1 * | 10/2018 | Schwarz | G01B 11/275 |
| 2002/0189114 | A1 * | 12/2002 | Voeller | G01B 5/255 33/203.18 |
| 2005/0206098 | A1 * | 9/2005 | Ohnesorge | B60B 7/18 279/46.1 |
| 2014/0284994 | A1 * | 9/2014 | Polka | B60B 7/068 301/37.102 |
| 2015/0251488 | A1 * | 9/2015 | Hoff | B60B 7/068 411/81 |

* cited by examiner

POSITIVE-LOCK CLAMP / ADAPTER

BACKGROUND

Field of Invention

The present invention relates to a clamping mechanism in the wheel alignment process of a vehicle, during which mounting of measuring heads, sensors or targets onto the wheels/rims is necessary.

Description of the Problem Solved

Conventional vehicle wheel alignment systems use alignment elements referred to as "alignment heads, alignment sensors or targets" that are attached to the wheels (rim or tire) of a vehicle to measure various angles of the wheels and suspension.

This type of alignment equipment usually includes a "wheel clamp" that attaches to a vehicle's wheel (rim or tire) and holds the alignment element (i.e., the head, sensor or target).

Mounting of the "wheel clamp" onto a wheel is typically accomplished using gripping devices or grabbers which are part of the wheel clamp. Mounting of the "wheel clamp" onto the rim or tire, typically takes place by using specially designed hooks (non-integral adapters) that attach to either the inner or the outer edge of the rim and/or around the tire.

Mounting of such "wheel clamps" is an imperfect mechanical process that has led to creative and sometimes crude methods of securely attaching rim clamps to wheels/rims. Human error, aging alignment components, and sheer weight of alignment heads, sensors or targets can unintentionally induce angles that must be extrapolated from the actual measurements obtained by alignment heads. The process to extrapolate the imperfections of the mounting of the clamp is called "Runout".

Conventional alignment systems perform a "Runout" detection process by either lifting each axle of the vehicle and taking multiple measurements or by pushing the vehicle while taking multiple measurements that ultimately result in calculation of "Runout" (The Runout calculation will be used to compensate the actual alignment measurements taken by the heads or sensors). Both of these common methods are very time consuming, especially in Heavy Duty Vehicles (semi trucks and trailers), hereinafter referred to as HD, which can have multiple axles, and may require additional equipment to perform these procedures.

Accordingly, a need exists for a wheel clamp that offers a new method of mounting with a positive lock that eliminates play/deflection/movement, eliminates non-integral adapters, provides accurate mounting to eliminate the need of "Runout" measurement and allows mounting on virtually any size and type of wheel. This nonprovisional patent application is the continuation of our provisional patent application registered with USPTO as follows:

SUMMARY OF THE INVENTION

The present invention seeks to provide a solution to these problems by providing a precisely CNC-machined Clamp/Adapter that is based around the concept of a mechanism which engages onto the threaded studs of the axle's hub without needing to remove the wheel.

The Clamp/adapter positively rests on a precise surface provided by the rim's flat surface, thus resulting in the elimination of mechanical mounting imperfections and the need to perform the lengthy "Runout" process.

DESCRIPTION OF THE PREFERRED EMBODIMENTS

The invention includes a mechanical apparatus that will attach to the threaded stud of the axle's hub, while resting on the flat surface of the rim, thus providing a positive mechanical contact that can be used to measure wheel alignment angles. The invention includes three methods to attach to the treaded stud of the axle's hub. The method to be used will depend on the class of vehicle and/or type of wheel:

Method #1

Figure 1:
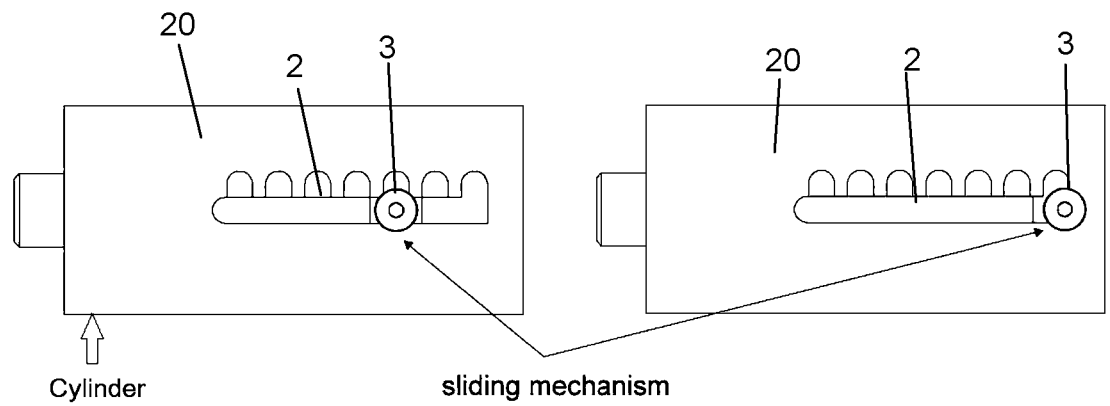
FIG. 1 shows two side views of a cylinder (20) with an interchangeable retractable mechanical apparatus that will slide and thread onto the studs of the axle's hub. This mechanism enables fast engagement of stud threads, without the need to turn every thread of the stud. A sliding mechanism (2,3) slides inside the cylinder (20). The sliding mechanism (2,3) is shown in two sliding positions.

Cylinders with an interchangeable retractable mechanical apparatus that will thread, rotate and slide onto the studs of the axle's hub (FIG. 1).

Figure 2:
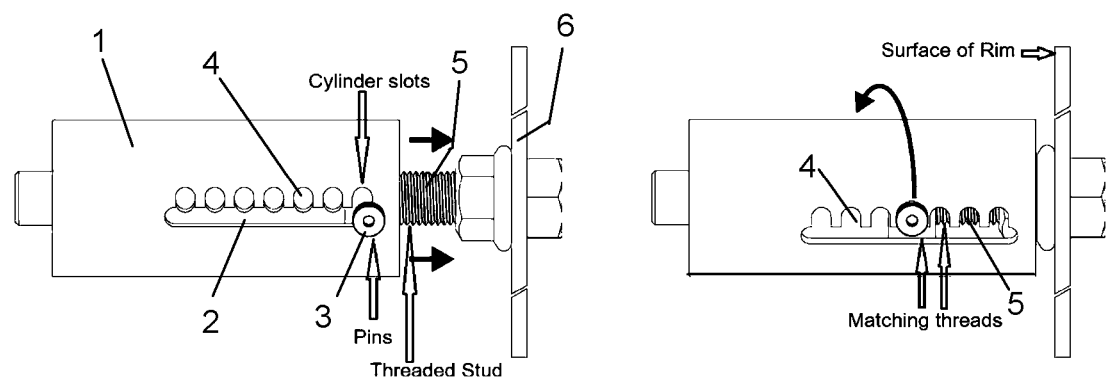
FIG. 2 shows that the interchangeable apparatus (1) contained inside the cylinder (20) matches the thread size/type of the stud (5). The rim (6) is also shown. The cylinder (2) and internally threaded interchangeable apparatus (1) turn clockwise to engage onto the stud (5). By pushing the cylinder (20) towards the surface of the rim (6), the cylinder (20) travels along the length of the stud (5) without the need to thread until it gets engaged in the appropriate notch (4) of the sliding mechanism (2,3) by means of a simple turn counterclockwise of the interchangeable apparatus (1).

The apparatus contained inside the cylinder has threads that match the threads of the stud of the wheel (FIG. 2). The apparatus contained inside the cylinder is mechanically engaged to the cylinder using slots and pins, but has an independent movement from the cylinder itself. This mechanical apparatus retracts automatically and is threaded, rotated and pushed by the user with the simple force of his/her hand.

The cylinders are individually mounted over the nut by completing approximately 2 revolutions at the end of the stud positively threading the retractable mechanism on the stud of the hub then pushing the cylinder until the surface of the cylinder is close to the surface of the rim (FIG. 2).

The retractable mechanism, when combined with the cylinder, offers the function to turn and engage at different distances (along the length of the stud), by pushing against the self retracting mechanism until the required distance has been reached. This mechanism therefore by-passes the need to turn the cylinder or apparatus every thread the entire length of the stud.

Figure 3:
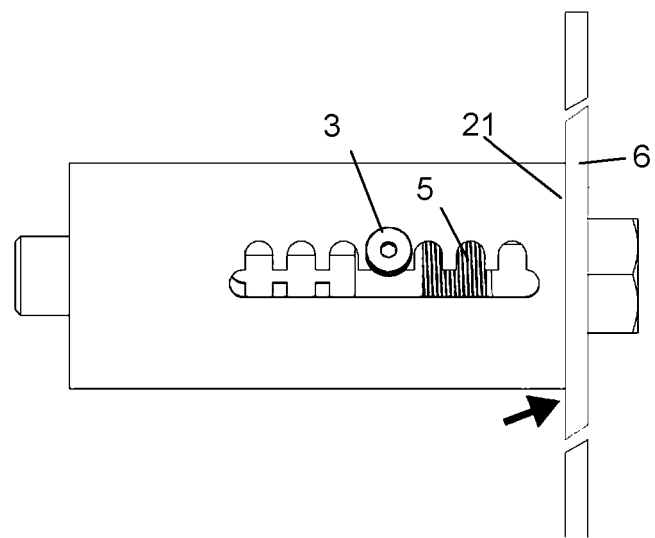
FIG. 3 shows how the cylinder front surface (21) makes a positive mechanical connection with the flat surface of the rim (6).

The final step to mount the cylinders onto the studs shall be performed by turning the cylinder by hand until the surface of the cylinder has made a positive mechanical connection with the surface of the rim, thus eliminating any play or mount imperfection creating a well-defined measuring point for additional components necessary to complete the installation. (FIG. 3).

Method #2

Figure 4:
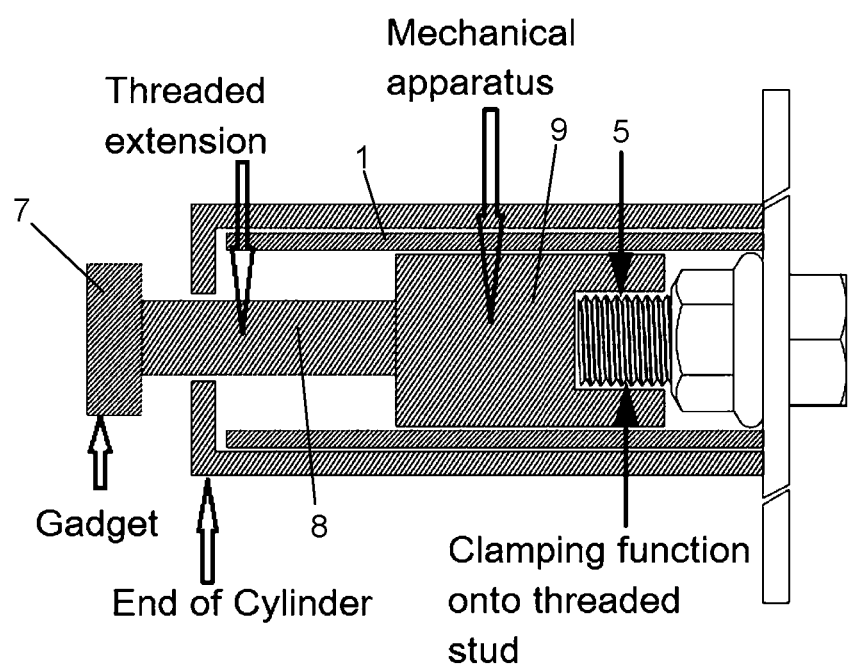
FIG. 4 shows a cross-section of the cylinder (21) with the interchangeable apparatus (1) containing an internal mechanical apparatus (9) that clamps onto the treaded studs (5) of the axle's hub. A gadget (7) is used to turn an internal shaft (8) that screws the mechanical apparatus (9) securely onto the stud (5).

Cylinders with an internal mechanical apparatus that will move inwards and outwards and clamp onto the treaded studs of the axle's hub (FIG. 4). The apparatus contained inside the cylinder has a clamping function that will attach to the stud of the wheel using a contraction mechanism that will apply pressure against the stud and create a mechanical connection (FIG. 4).

Figure 5:
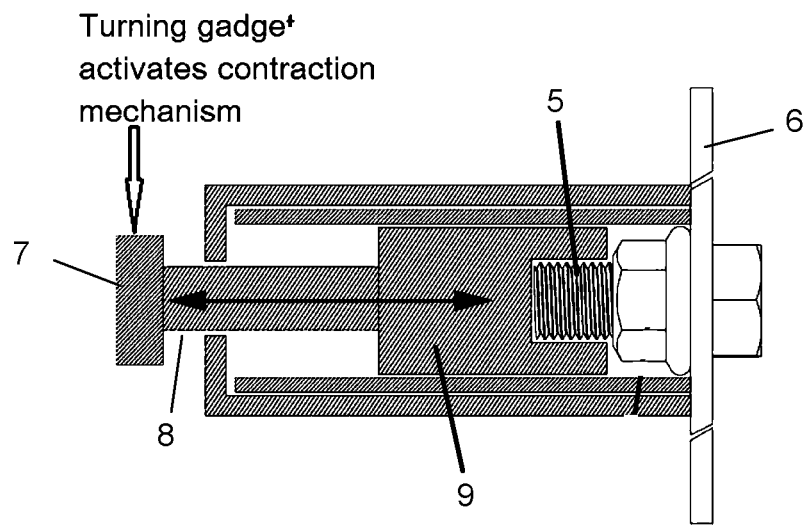
FIG. 5 shows cylinders with internal clamping apparatus using a threaded extension that engages at the end of the cylinder. The end of this threaded extension is connected to a gadget that when operated, will cause the threaded extension to turn and to activate the contraction mechanism shows how turning the gadget (7) rotates the shaft (8) to tighten the mechanical apparatus (9) and hence the entire cylinder (20 not shown in FIG. 5) on the stud (5).

The internal clamping apparatus may be mechanically connected to the cylinder using a treaded extension that engages at the end of the cylinder. The end of this treaded extension is connected to a gadget (ratchet, knob or similar) that when operated, will cause the treaded extension to turn and to activate the contraction mechanism (FIG. 5).

The final step to mount the cylinders onto the studs using this method, shall be performed by turning the gadget by hand until the contraction mechanism has made positive contact with the treaded stud and the surface of the cylinder has made a positive mechanical connection with the surface of the rim, thus eliminating any play or mount imperfection creating a well-defined measuring point for additional components necessary to complete the installation. (FIG. 5).

Method #3

Figure 6:
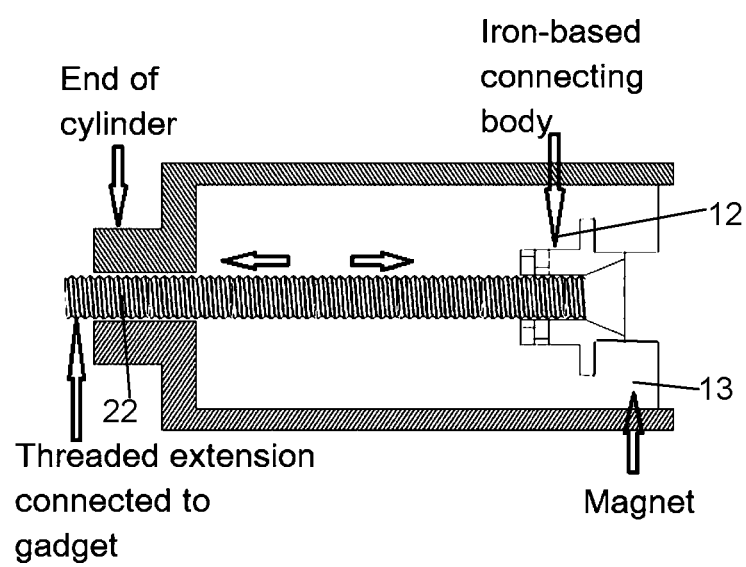
FIG. 6 shows an internal diagram of cylinder (20) with a magnet (13) mechanically connected to the cylinder (20 not shown in FIG. 6) using an iron-based connecting body (12) with a treaded extension (22) that engages at the end of the cylinder

Cylinders with an internal mechanical apparatus that will move inwards and outwards and attach onto the treaded studs or the nuts of the axle's hub using a magnet (FIG. 6).

The apparatus contained inside the cylinder has a magnet that will attach to the stud or the nut of the wheel (FIG. 6).

The Magnet may be mechanically connected to the cylinder using an iron-based connecting body with a treaded extension that engages at the end of the cylinder. The end of this treaded extension is connected to a gadget (ratchet, knob or similar) that when operated, will cause the magnet to get closer to the stud or nut, until the magnet makes positive contact (FIG. 6).

The final step to mount the cylinders onto the studs using this method, shall be performed by turning the cylinder itself by hand until the surface of the cylinder has made a positive mechanical connection with the surface of the rim, thus eliminating any play or mount imperfection creating a well-defined measuring point for additional components necessary to complete the installation. (FIG. 3).

Final Mounting Process of System

The following are the next steps that will typically follow, to mount the rest of the system, independently of which of the three methods to attach to the treaded stud of the axle's hub is used.

Figure 7:
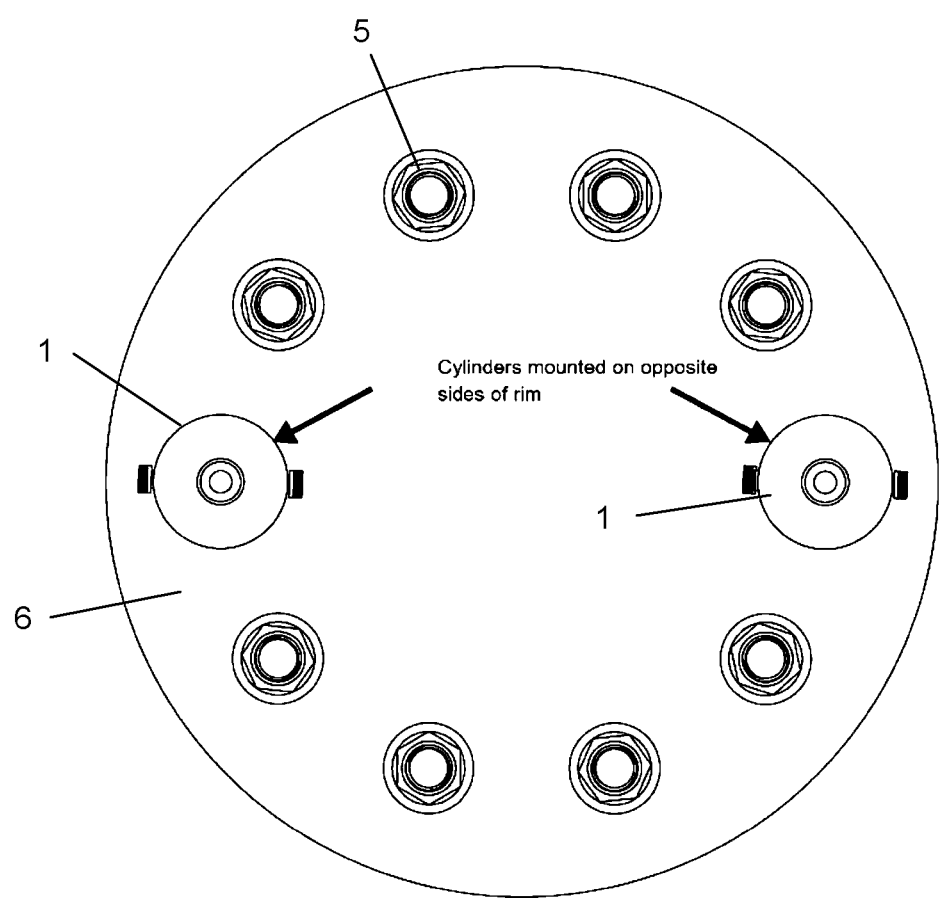
FIG. 7 shows a pair of cylinders (1) mounted on a rim (6) one across from the other on opposite sides of the rim (6) creating a distance in between them that is defined by the distance of the studs.

A pair of these cylinders will typically be mounted one across the other horizontally, creating a distance in between them that is defined by and equal to the distance between the studs (FIG. 7).

Figure 8:
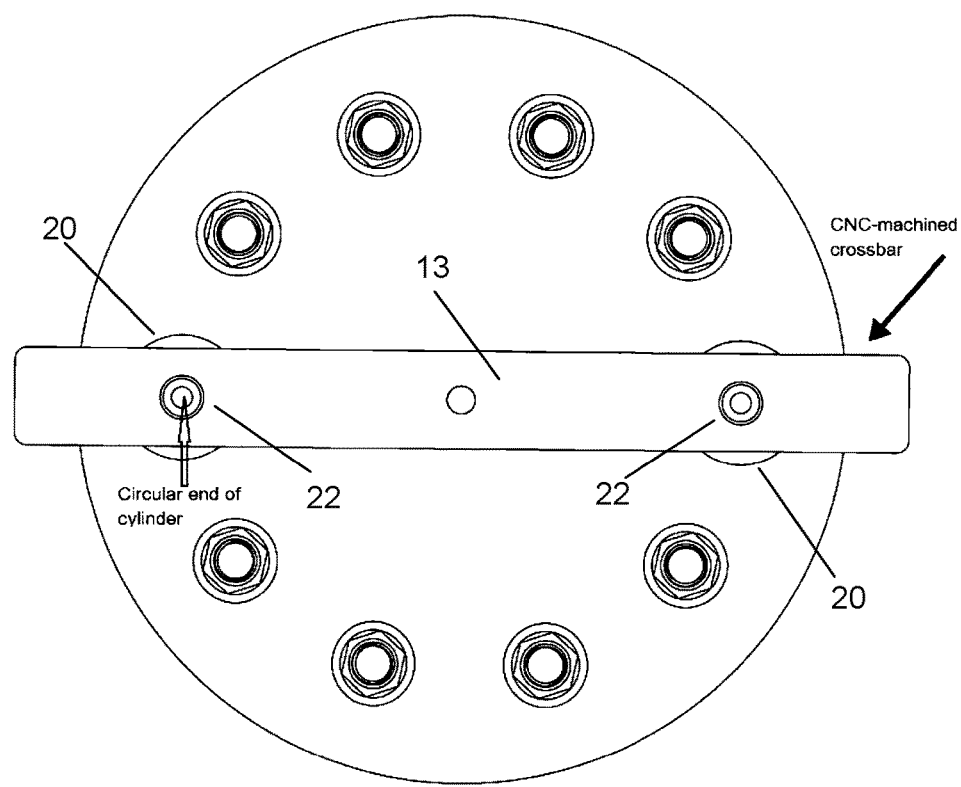
FIG. 8 shows a CNC-machined crossbar (13) installed on the circular ends (22) of the cylinders (20), by engaging and attaching the bar into onto the ends of the cylinder serves as an accurate base for mounting measuring equipment.

After the cylinders have been mounted and secured, a CNC-machined crossbar is installed on the circular end of the cylinders serving as an accurate base for mounting the alignment sensor (FIG. 8).

Figure 9:
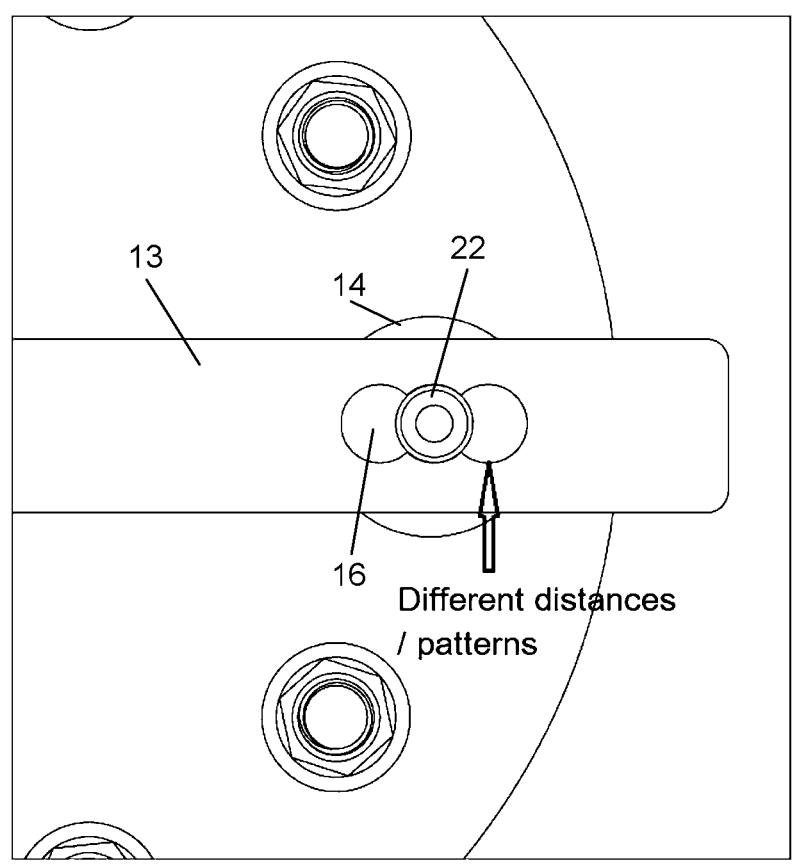
FIG. 9 shows that the crossbar (13) has the openings (16) machined at different pre-defined distances to accommodate hub and bolt patterns used in the industry (for example 285.75 mm.).

The crossbar has openings machined at pre-defined distances to accommodate wheel hub and bolt patterns used in the industry, (i.e 285.75 mm.) (FIG. 9)

Figure 10:
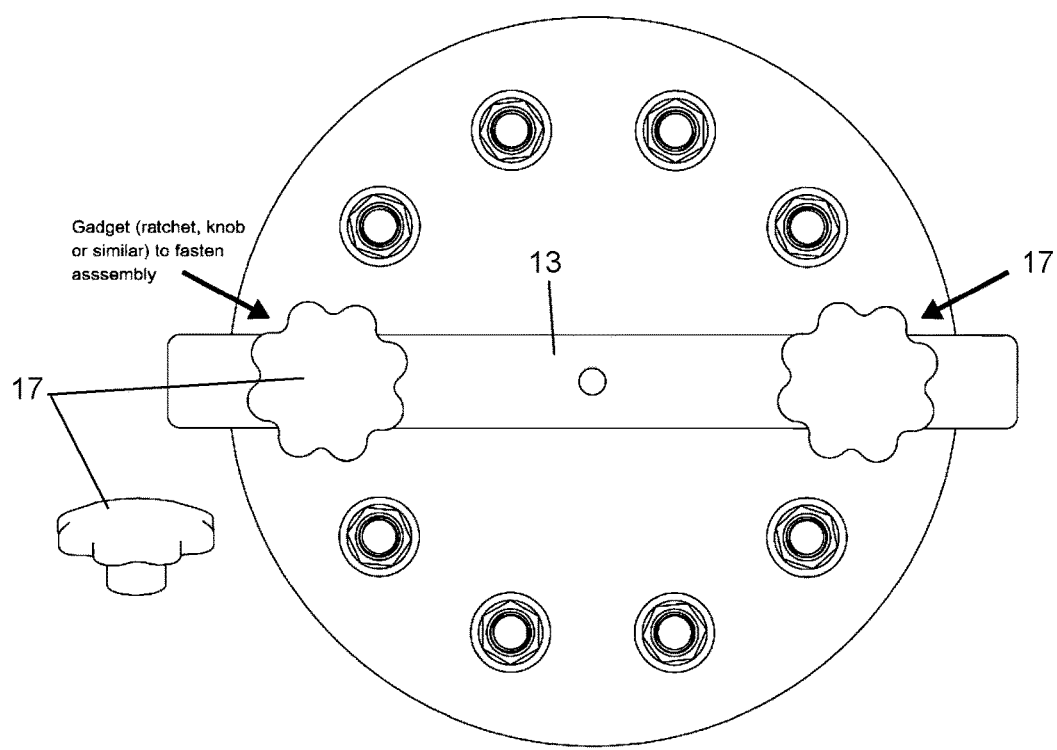
FIG. 10 shows the crossbar (13) mounted on cylinders fastened by knobs (17), which will assist in eliminating any mechanical play of the complete mounted assembly.

Finally, the user will proceed to tighten the crossbar onto the cylinders by means of fastening gadgets (ratchets, knobs or similar), which will further eliminate any mechanical play or movement of the complete mount and assembly (FIG. 10).

Figure 11:
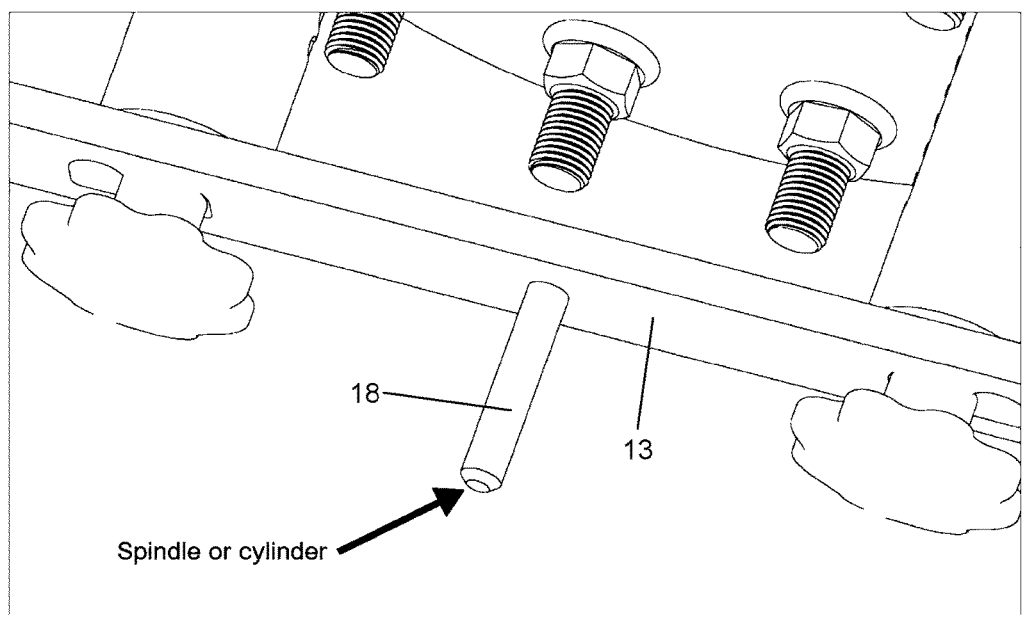
FIG. 11 shows the crossbar (13) mounted on the cylinders contains a mechanical end (18) (typically a spindle or a cylinder) that allows mounting of the sensor, head or target for the purpose of taking measurements

The crossbar mounted on the cylinders contains a mechanical end (typically a spindle or a cylinder) that allows mounting of the sensor, head or target for the purpose of taking measurements. Because of the accurate mounting explained previously, measurements can be taken without the need to perform the Runout process (compensation of imperfect mounting) (FIG. 11).

Figure 12:
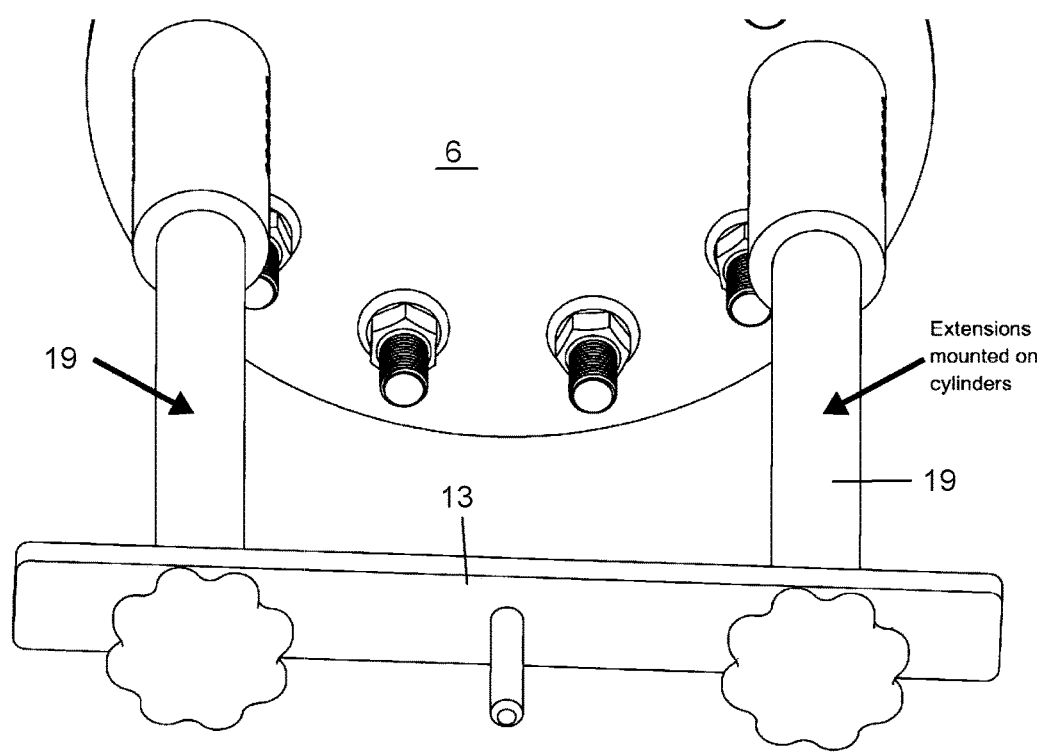
FIG. 12 shows an HD vehicle application of rims in the rear axle at a different depth than the rims in the front axle, thus requiring extensions (19) to move the crossbar away from the rim for the cylinders.

The invention includes a design of extensions to accommodate different depths of rims, such as it may be the case in rear axles of HD trucks or trailers. These extensions can be mounted onto the cylinders by engaging them into the circular ends of the cylinder. (FIG. 12)

Several descriptions and illustrations have been presented to aid in understanding the present invention. One with skill in the art will realize that numerous changes and variations may be made without departing from the spirit of the invention. Each of these changes and variations is within the scope of the present invention.

The invention claimed is:

1. A clamp/adapter pair directly mountable on a vehicle rim for attaching heads, sensors or targets during wheel alignment of a vehicle, each member of the pair comprising:

a cylinder (20) having a back surface and a front surface (21), the cylinder (20) containing a sliding mechanism (2,3) and an interchangeable apparatus (1) constructed to allow the cylinder (20) to slide onto a vehicle lug nut's threads (5) and then grip the threads (5) when the sliding mechanism (2,3) is released;

an internal mechanical apparatus (9) mounted in the interchangeable apparatus (1) constructed to be threaded onto the vehicle lug nut's threads (5) after the sliding mechanism (2,3) is released; the internal mechanical apparatus (9) constructed to be tightened with a gadget (7) attached to an internal shaft (8) that cooperates with the internal mechanical apparatus (9) causing the cylinder (20) to make a positive mechanical connection the vehicle rim (6);

the cylinder (20) having a protruding central circular end (22) extending outward from the back surface.

2. The clamp/adapter pair of claim 1, wherein the cylinders (20) of the pair are adapted to be mounted separated from one-another on the rim (6) using two lug nut's threads (5) that are opposite one-another on the rim (6); and wherein, a machined crossbar (13) is adapted to be attached to the protruding central circular ends (22) of the cylinders (20) of the pair.

3. The clamp/adapter pair of claim 2, wherein the machined crossbar (13) is configured to mount heads, sensors or targets.

4. The clamp/adapter pair of claim 2, wherein the machined crossbar (13) includes a plurality of openings (16) constructed to match different sizes and shapes of rims and bolt patterns.

5. The clamp/adapter pair of claim 2, wherein the machined crossbar (13) can be extended away from the cylinders (20) with extenders (19).

* * * * *